(12) United States Patent
Neuhaus

(10) Patent No.: US 8,432,444 B2
(45) Date of Patent: Apr. 30, 2013

(54) METHOD FOR MONITORING SURVEILLANCE AREA

(75) Inventor: Holger Neuhaus, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1357 days.

(21) Appl. No.: 11/326,052

(22) Filed: Jan. 5, 2006

(65) Prior Publication Data

US 2006/0182310 A1    Aug. 17, 2006

(30) Foreign Application Priority Data

Feb. 15, 2005   (DE) .......................... 10 2005 006 989

(51) Int. Cl.
*H04N 7/18*        (2006.01)
(52) U.S. Cl.
USPC .......................................................... 348/143

(58) Field of Classification Search ........... 348/143–160
See application file for complete search history.

(56) References Cited

U.S. PATENT DOCUMENTS 5,969,755 A * 10/1999 Courtney ....................... 348/143
7,446,797 B2 * 11/2008 Lee ................................ 348/143

* cited by examiner

*Primary Examiner* — Luong T Nguyen
(74) *Attorney, Agent, or Firm* — Michael J. Striker

(57) ABSTRACT

A method of monitoring a surveillance area with sensors of a monitoring system has the steps of extracting from signals of the sensors elements of the surveillance area and attributes allocated to the elements, initially deriving text attributes from the attributes extracted from the sensor and allocating the same to the elements, and storing the elements and their attributes in a memory device.

7 Claims, 3 Drawing Sheets

| Extracted Attributes | | | | | | | | |
|---|---|---|---|---|---|---|---|---|
| Elements Moving Apart | Elements Coming Together | Distance | Change of Direction | Change of Shape | Time Frame | Critical Area | | Text Attributes |
| | | ~0 | | | | | Staying | |
| | | >0 | | | X | X | Pausing | |
| | | | | | | | Moving | |
| | | | X | | | | Going Elsewhere | |
| | | | | X | | | Picking Up | |
| X | | | | X | | | Putting Down | |

METHOD FOR MONITORING SURVEILLANCE AREA

CROSS-REFERENCE TO RELATED APPLICATION

The invention described and claimed hereinbelow is also described in German Patent Application DE 10 2005 006 989.4 filed on Feb. 15, 2005. This German Patent Application, whose subject matter is incorporated here by reference, provides the basis for a claim of priority of invention under 35 U.S.C. 119(a)-(d).

BACKGROUND OF THE INVENTION

The invention relates to a method for monitoring a surveillance area.

Known methods for the detection and analysis of events in a surveillance area monitored by a monitoring system are based on the analysis (content analysis) of video and optionally audio data, which are detected by appropriate sensors and delivered to analysis modules of the monitoring system. Video cameras, motion detectors, sound sensors, and the like are for instance used as sensors. A monitoring system of the generic type here for instance includes hundreds or even thousands of sensors whose signals have to be processed. This processing also encompasses the comparison of the signals with values stored in a memory device.

To enable a fast search in the memory device and a comparison with the data stored in it, it has proved expedient to index the signals. In the indexes (metadata), typically only the outcomes of this content analysis are stored, but not intermediate outcomes such as texture, histogram, and so forth. If an internal semantic representation is generated at all in the monitoring system, it is generally limited to representing objects in a scene under surveillance detected (such as "moving object", "probably car") or to a scene under surveillance itself (such as "outdoors", "beach"). However, such representations are not generic. Therefore in an inquiry based on such analyses made to a memory device with stored results of monitoring, a search can be made only for previously known events. In conventional multimodal retrieval systems, furthermore, only a search by means of an example (query by example) is possible, but not a search by text description.

SUMMARY OF THE INVENTION

It is therefore an object of the present invention to provide a method for monitoring a surveillance area, which is a further improvement of the existing methods.

In keeping with these objects and with others which will become apparent hereinafter, one feature of the present invention resides, briefly stated, in a method of monitoring a surveillance area with sensors, of a monitoring system, comprising the steps of extracting from signals of the sensors elements of the surveillance area and attributes allocated to the elements; initially deriving text attributes from the attributes extracted from the sensor and allocating the text attributes to the elements; and storing the elements and their attributes in a memory device.

The invention offers the advantage that for analyzing events in a scene, detected by a monitoring system, of a surveillance area, metadata can be used that take into account not only the events but also intermediate events of a contact analysis of the scene. As a result, in an expansion of the "vocabulary" for describing events, having to subject the entire contents of a memory device to content analysis all over again can be avoided.

Advantageously, abstract elements that are not adapted to highly specific sequences of events but instead are kept generic are also defined. This has the particular advantage that variations in the sequences of events do not necessitate the formation of new elements. Instead, in most cases it suffices to modify or adapt only attributes of already known elements.

Moreover, the elements or chains of elements formed by analysis of the scenes can be allocated to a certain object in a scene. This makes it possible to observe the fate of a specific object in a surveillance area without changing or influencing other objects that are not presently of interest. By means of additionally allocated text attributes, it furthermore becomes possible to search for stored elements and attributes using keywords.

The novel features which are considered as characteristic for the present invention are set forth in particular in the appended claims the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
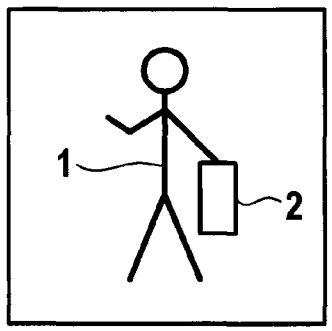
FIG. 1 shows a first scene in a surveillance area monitored with a method in accordance with the present invention.

In the method of the invention, a surveillance area is monitored with sensors. The surveillance area in the sense of the invention may be a single building, a public square or a street, a section of a city, or the like. For monitoring the surveillance area, only a few sensors may be provided, or a great number of sensors, for instance hundreds or even thousands of sensors. These sensors make seamless monitoring possible for instance of all the entrances and rooms of a building, entire lengths of streets, or other traffic routes, such as railroad routes, shipping lanes, and the like. As sensors, optical sensors are preferably used, such as CCD cameras in particular, acoustic sensors such as microphones in particular, and radar and lidar sensors.

From the sensor output signals, elements of the surveillance area and attributes of the elements are extracted. In the sense of the invention, the term elements of the surveillance area means stationary or moving objects or groups of such objects. For instance, the entrance to a building is one such stationary object located in a surveillance area. A person moving in the surveillance area is an example of a moving element. An example of a group of elements, in this case a group of moving elements, is a person carrying a suitcase.

Examples of attributes of these elements are their geometric shape, and in particular their size, position, or form of motion, their color, their distance, or other properties of these elements that are detectable by the sensors. The space being monitored can itself be considered such an element. The attributes to be allocated to it can then include for instance light conditions, such as daytime and nighttime, and acoustic events picked up by the sensors. Further attributes refer to the relationship of elements to one another, or they describe sequences which are also based on a time scale. In the example briefly mentioned above of a person carrying a suitcase, both the person and the suitcase may be considered as elements within the space being monitored.

A scene detected by the sensors in the space being monitored could be described textually as follows: The suitcase is taken (by a person) out of a room. The individual elements are to be allocated the following chains of attributes that represent action sequences. The attributes of walking, picking up, and carrying can be allocated to the person. Conversely, the attributes of standing, being picked up, and being carried can be allocated to the suitcase. The elements and a substantial proportion of their attributes can expediently be detected fully automatically by evaluation of sensor signals. For instance, moving elements can thus be extracted from successive video recordings. In addition, their geometric dimensions, their surface structures and in particular their color, and their relative location with respect to a reference point or with respect to other elements can be detected.

This automation proves especially expedient when the signals of a large number of sensors have to be evaluated. If the elements are additionally allocated text descriptions as attributes and these are stored together with the elements in the memory device, then a search in the memory device can be simplified by means of the query with keywords. As will be explained using an example described at length below, the allocation of text attributes can in some cases be enabled essentially automatically, in that the attributes of elements, extracted from the sensor signals, are allocated text attributes by being input into a matrix.

The transfer of an object, in this case a suitcase 2, from a first person 1 to a second person 5, as detected by sensors in a surveillance area will now be explained in conjunction with the schematic drawings in FIGS. 1 through 7. These drawings each show scenes, detected at a specific time, from a surveillance area monitored by the monitoring system.

Figure 2:
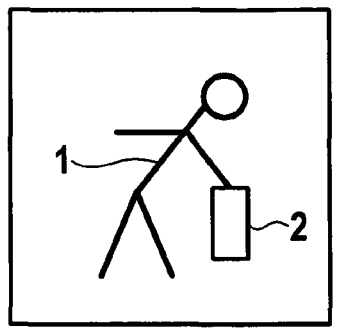
FIG. 2 shows a second scene in a surveillance area monitored with a method in accordance with the present invention.
Figure 3:
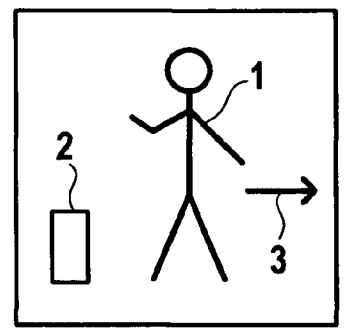
FIG. 3 shows a third scene in a surveillance area monitored with a method in accordance with the present invention.
Figure 4:
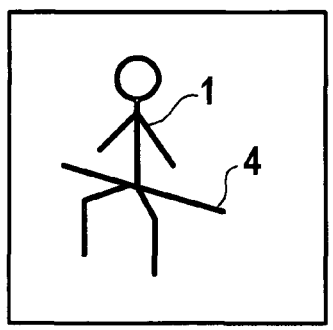
FIG. 4 shows a fourth scene in a surveillance area monitored with a method in accordance with the present invention.
Figure 5:
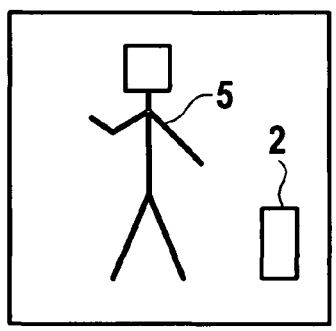
FIG. 5 shows a fifth scene in a surveillance area monitored with a method in accordance with the present invention.
Figure 6:
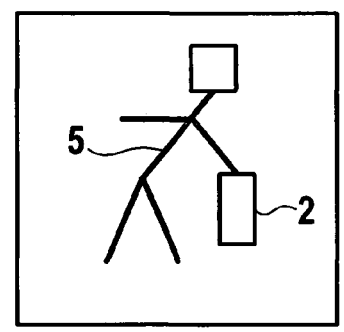
FIG. 6 shows a sixth scene in a surveillance area monitored with a method in accordance with the present invention.
Figure 7:
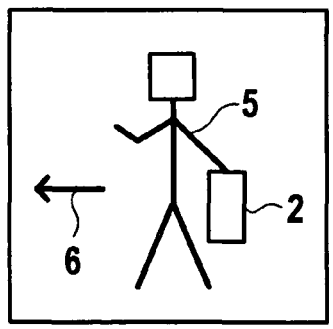
FIG. 7 shows a seventh scene in a surveillance area monitored with a method in accordance with the present invention.

The surveillance area may for instance be the waiting room of a railroad station or of an airport. In FIG. 1, a person 1 is approaching who is carrying a suitcase 2. In FIG. 2, the person 1 bends over and puts the suitcase 2 down on the floor of the waiting room. Next, the person 1 moves away in the direction of the arrow 3, leaving the suitcase 2 behind (FIG. 3). FIG. 4 shows that the person 1 has taken a seat on a bench 4. In FIG. 5, a second person 5 approaches the suitcase 2 that has been put down. FIG. 6 shows that the person 5 bends over and grasps the suitcase 2 that has been put down. In FIG. 7, the person 5, with the suitcase he has picked up, moves away in the direction of the arrow 6.

The monitoring system of the invention, by means of its sensors, detects not only the persons 1 and 5 but also the suitcase 2 as elements from the surveillance area. At the same time, the sensors detect attributes of the elements 1, 2, 5, in particular such as the shape and size of the persons 1, 5, the posture of the persons 1, 5, the motion or direction of motion of the persons, the color of their clothing, the location at the time of the suitcase 2, and its size, shape and color. These attributes are allocated to the various elements and stored together with them in a memory device; these data are preferably indexed, to make a fast search possible. The detection of the elements and of the aforementioned attributes as well as the allocation of the attributes to the various elements are preferably done fully automatically, which makes it possible to process large quantities of data in a short time.

Figures 8, 9:
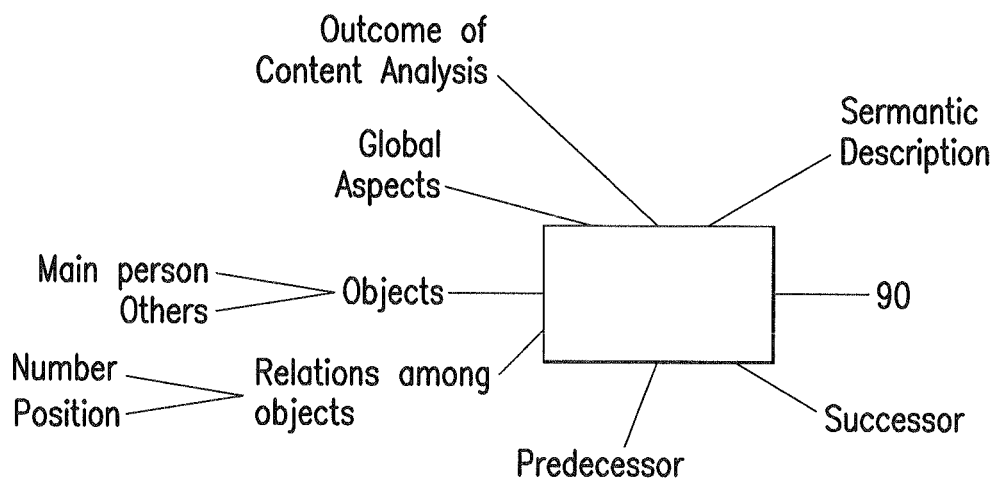
FIG. 8 shows an allocation table for illustrating a method for monitoring a surveillance area in accordance with the present invention.
FIG. 9 is a diagram showing the elements and their attributes.

Especially advantageously, the elements are additionally allocated text attributes, which make an effective keyword search possible in the data sets stored in the memory device. This will now be explained with reference to FIG. 8. FIG. 8 shows a matrixlike allocation table, by means of which text attributes can be allocated to the attributes detected by sensors of the monitoring system. These text attributes are likewise allocated then to the various elements and stored together with the element data in the memory device. The text attributes make it easier to find the elements quickly in the search. The allocation table shows attributes in columns which are detected by the sensors of the monitoring system and allocated to the various detected elements, such as "elements moving apart", "elements coming together", "distance", "change of direction", change of shape", "time frame", and "critical area". Such text attributes as "staying", "pausing", "moving", "going elsewhere", "picking up", and "putting down" are associated with the columns in the allocation table.

By way of the matrixlike structure of the allocation table, the attributes of the elements detected by the sensors of the monitoring system are now allocated corresponding text attributes; these text attributes are in turn also allocated to the elements and then stored together with these elements as metadata in a memory device of the monitoring system.

For instance, the following allocations are found in the allocation table in FIG. 8. From the scenes in the surveillance area detected in FIG. 2 and FIG. 3, the sensors of the monitoring system recognize that elements detected by them, namely the person 1 and the suitcase 2, are becoming separated from one another. In addition, a change in shape of one element, namely the person 1, is recognized. Both attributes are allocated to the text attribute "putting down". In the scene shown in FIG. 6, a change in shape of an element is recognized, namely a change in shape of the person 5 who in the seam shown in FIG. 5 has approached the suitcase 2, walking upright. The change in shape of the person 5 in the immediate vicinity of the suitcase 2 results in an allocation of the text attribute "picking up". A content analysis of the sequence shown in FIGS. 1 through 7 can thus lead to a verbal description of the sequence stating that a suitcase is put down by a first person and picked up by a second person. However, the sequence could also mean that a suitcase put down by a first person is being stolen by a second person. This variant is highly likely, if there is a report of the loss or theft of a suitcase soon after this sequence.

Breaking down complex scenes in a surveillance area into elements provided with attributes, and storing the elements in a memory device, along with an effective search capability using keywords and text attributes, leads to fast analysis of the events taking place in the surveillance area. Dangerous situations can thus be quickly detected and defended against. In practice, breaking down a scene into elements and allocated attributes can for instance expediently be done whenever the monitoring system detects a change in analyzing a scene being observed by its sensors. This may involve a moving object, such as a person moving in the surveillance area, or a random acoustic event, such as a bang.

For analyzing which elements are then involved, the monitoring system essentially performs two steps. First, in a predeterminable time frame, by means of the sensors of the monitoring system, it is ascertained how many elements are present in the scene being observed, and what attributes can be allocated to these elements. Simultaneously, global partners in the scene, such as the light conditions and/or acoustic events prevailing at just that time, can also be detected and allocated to the elements. In an ensuing step, the attempt is then made to ascertain the particular predecessors of the elements, or in other words to trace a chain of the elements back into the past.

In the event that an evaluation is done post hoc, or in other words only afterward and not at the time the recording was made, the chain of elements can also be traced into the future, by identifying successors of the various elements. On the basis of the information additionally obtained as a result, a refined description is made of the scenarios present in the time frame being observed. The easy search for the elements stored in the memory device speeds up this analysis.

The diagram shown in FIG. 9 illustrates these relationships once again. In the center of the diagram, an element 90 is shown with its attributes. From the outcome of a content analysis of a scene detected by the monitoring system, individual objects or elements are identified. Elements or chains of elements are allocated to a certain object in a scene, since for each of these objects, one element of its own, with the applicable object as the main actor, has advantageously been generated.

Attributes that are to be allocated to the elements may be derived from properties of the objects themselves or from relationships of the objects with one another. Further attributes furnish global aspects that characterize the entire scene, as well as text attributes or semantic descriptions, which as noted above can advantageously be derived from other attributes by means of an allocation table. Moreover, the observation of predecessors, or in other words a look into the past, or the observation of successors, that is, a look into the future, offers further findings that make even more-precise classification of the elements possible.

Figure 10:
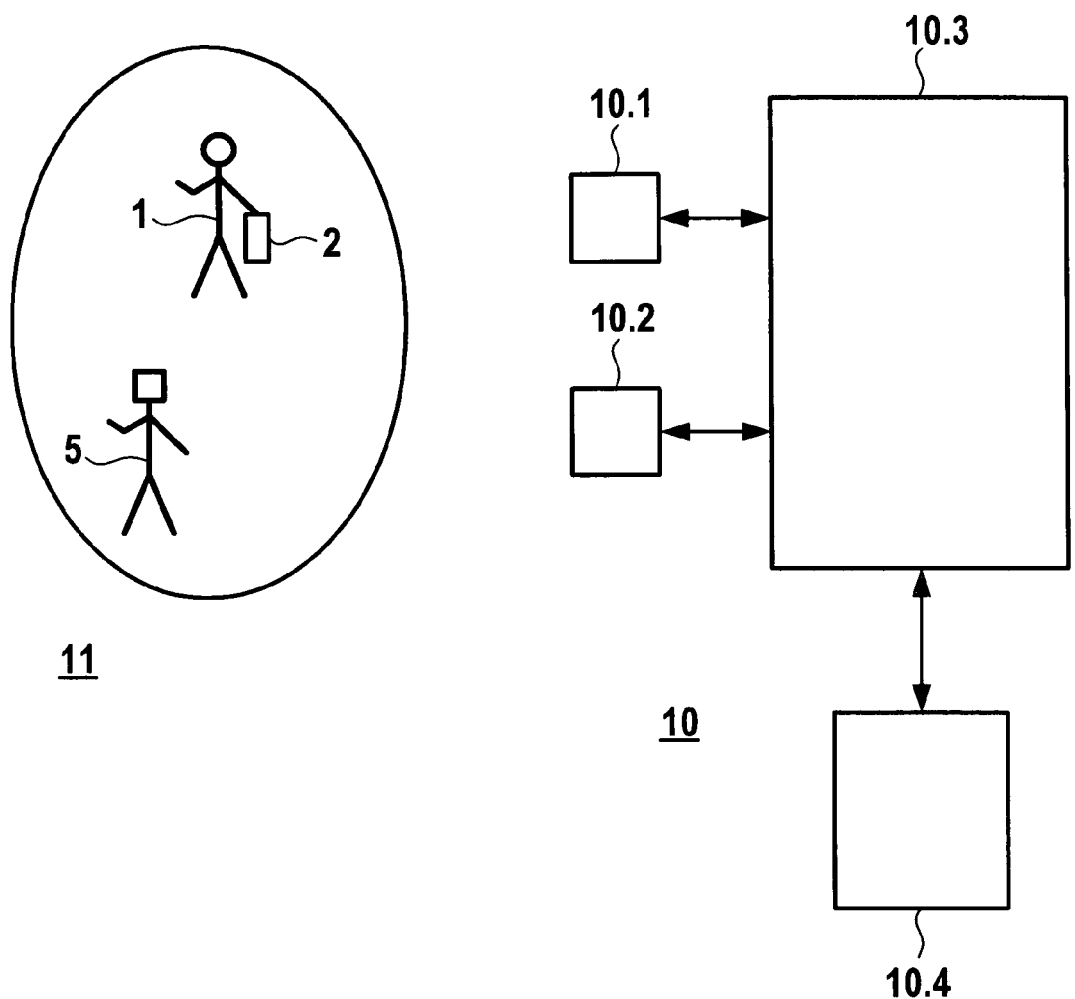
FIG. 10 is a block diagram of a monitoring system.

In FIG. 10, a block diagram of a monitoring system 10 is shown. The monitoring system 10, with sensors 10.1, 10.2, monitors a surveillance area 11. The signals of the sensors are evaluated by an evaluation device 10.3. This evaluation device ascertains elements, for instance as already described above, such as the persons 1, 5 and the suitcase 2, in a scene of the surveillance area 11. The monitoring system 10 further includes a memory device 10.4, in which the elements recognized by the monitoring system are stored along with their attributes.

It will be understood that each of the elements described above, or two or more together, may also find a useful application in other types of constructions differing from the types described above.

While the invention has been illustrated and described as embodied in a method for monitoring a surveillance area, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A method of monitoring a surveillance area with sensors of a monitoring system, comprising the steps of
    extracting from signals of the sensors, elements of the surveillance area and attributes allocated to the elements;
    initially deriving text attributes from the attributes extracted from the sensors and ascertaining the text attributes to be allocated to the elements by means of a matrix-like allocation table, wherein the extracted attributes are provided on an input side and the text attributes are provided on an output side of the matrix-like allocation table;
    allocating the ascertained text attributes to the elements;
    storing the elements and their text attributes in a memory device; and
    using the text attributes allocated to the elements as search terms using keywords during a search for the stored elements.

2. A method as defined in claim 1; and further comprising comparing the stored elements with elements extracted later from the surveillance area.

3. A method as defined in claim 1; and further comprising using the text attributes allocated to the elements as search terms during a search for the stored elements.

4. A method as defined in claim 1; and further comprising for describing a scenario from the monitored surveillance area, forming chains of the elements by observation of predecessors and/or successors to one element of the elements in a chain, where the predecessors are elements occurring earlier than the one element in the chain and successors are elements occurring later than the one element in the chain.

5. A method as defined in claim 1; and further comprising allocating the elements such attributes which describe global properties of a scene, monitored by the monitoring system, in the surveillance area.

6. A method as defined in claim 1; and further comprising allocating the attributes which describe specific properties of an element extracted from a scene monitored by the monitoring system, in the surveillance area.

7. A method as defined in claim 1; and further comprising forming the allocated attributes to describe relationships among the elements.

* * * * *